United States Patent
Gorka

(10) Patent No.: US 9,634,578 B2
(45) Date of Patent: Apr. 25, 2017

(54) CURRENT ZERO CROSSING IN AN INVERTER

(71) Applicant: Bayerische Motoren Werke Aktiengesellschaft, Munich (DE)

(72) Inventor: Matthias Gorka, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/645,015

(22) Filed: Mar. 11, 2015

(65) Prior Publication Data

US 2015/0249404 A1 Sep. 3, 2015

Related U.S. Application Data

(63) Continuation of application No. PCT/EP2013/068677, filed on Sep. 10, 2013.

(30) Foreign Application Priority Data

Sep. 12, 2012 (DE) .......................... 10 2012 216 114

(51) Int. Cl.
 *H02P 6/00* (2016.01)
 *H02M 7/537* (2006.01)
 (Continued)

(52) U.S. Cl.
 CPC ........... *H02M 7/537* (2013.01); *H02M 7/539* (2013.01); *H02M 7/53871* (2013.01); *H02P 27/06* (2013.01); *H02M 2001/0012* (2013.01)

(58) Field of Classification Search
 CPC ........... H02P 6/085; H02P 7/0044; H02P 7/28
 (Continued)

(56) References Cited

U.S. PATENT DOCUMENTS

| 5,550,450 A | 8/1996 | Palko et al. |
| 6,236,174 B1 * | 5/2001 | White .................... H02P 6/182 318/400.2 |

(Continued)

FOREIGN PATENT DOCUMENTS

| CN | 201781456 U | 3/2011 |
| DE | 101 38 751 A1 | 3/2003 |

(Continued)

OTHER PUBLICATIONS

International Search Report dated Nov. 26, 2014 (Three (3) pages).

(Continued)

*Primary Examiner* — Rina Duda
(74) *Attorney, Agent, or Firm* — Crowell & Moring LLP

(57) ABSTRACT

Power electronics unit, which comprises a controller and at least one half bridge with a first switching element and with a second switching element, and has a phase current output between the two switching elements, at which phase current output the first switching element and the second switching element can be switched in the push-pull mode for a switching time at a cycle frequency, and at which the controller sets the switching time and/or the cycle frequency as a control variable, in order to provide, at the phase current output, a specified amplitude, frequency and phase position of the phase current in a switching cycle, so that the amplitude, the frequency and the phase position at the phase current output can be predicted at the phase current output for the switching cycle, the polarity of the phase current is used as an observation variable, and the determined switching time for the switching cycle is a function of the direction of the predicted phase current.

9 Claims, 3 Drawing Sheets

(51) Int. Cl.
*H02M 7/539* (2006.01)
*H02M 7/5387* (2007.01)
*H02P 27/06* (2006.01)
*H02M 1/00* (2006.01)

(58) Field of Classification Search
USPC ............... 318/400.29, 400.35, 798, 800
See application file for complete search history.

(56) References Cited

U.S. PATENT DOCUMENTS

| | | | |
|---|---|---|---|
| 7,449,844 B2* | 11/2008 | Lev | H05B 37/0263 315/291 |
| 8,193,537 B2* | 6/2012 | Mazzola | H01L 31/0312 117/951 |
| 2006/0220600 A1* | 10/2006 | Greene | B60N 2/0232 318/126 |
| 2010/0264839 A1* | 10/2010 | Kurokawa | H05B 41/2828 315/224 |
| 2012/0106221 A1* | 5/2012 | Ochi | H02M 7/53871 363/132 |
| 2014/0247025 A1* | 9/2014 | Dally | G05F 1/10 323/271 |

FOREIGN PATENT DOCUMENTS

| | | |
|---|---|---|
| DE | 10 2011 056 493 A1 | 8/2012 |
| DE | 10 2011 088 244 A1 | 6/2013 |
| EP | 1 645 885 A1 | 4/2006 |

OTHER PUBLICATIONS

German Search Report dated Aug. 1, 2013 with Statement of Relevancy (Five (5) pages).

Qingrong Zeng et al: "Development of an SVPWM-based predictive current controller for three-phase grid-connected VSI", Conference Record of the 2005 IEEE Industry Applications Conference Fortieth IAS Annual Meeting Oct. 2-6, 2005, Kowloon, Hong Kong, China, vol. 4, Oct. 2, 2005, pp. 2395-2400, XP010842744.

* cited by examiner

CURRENT ZERO CROSSING IN AN INVERTER

CROSS REFERENCE TO RELATED APPLICATIONS

This application is a continuation of PCT International Application No. PCT/EP2013/068677, filed Sep. 10, 2013, which claims priority under 35 U.S.C. §119 from German Patent Application No. 10 2012 216 114.7, filed Sep. 12, 2012, the entire disclosures of which are herein expressly incorporated by reference.

BACKGROUND AND SUMMARY OF THE INVENTION

The invention relates to a power electronics unit, which comprises a controller and at least one half bridge with a first switching element and with a second switching element, and has a phase current output between the two switching elements, at which output the first switching element and the second switching element can be switched in the push-pull mode for a switching time at a cycle frequency, and at which the controller sets the switching time and/or the cycle frequency as a control variable, in order to provide, at the phase current output, a specified amplitude, frequency and phase position of the phase current within an imminent switching cycle.

Today's inverters for hybrid or electric vehicles usually use bipolar transistors with an insulated gate electrode (IGBTs) as semiconductors. This is indicated, for example, in the abstract of Chinese Patent Document CN 201 781 456 U. Inverters with bidirectional semi-conductor elements, such as metal oxide semiconductor field effect transistors (MOSFETs), as a rule, are used less frequently, because MOSFET switching bridges allow the inverting of only lower voltages than IGBT bridges. MOSFET inverters are therefore limited in their efficiency and IBGT inverters are preferred in this respect in many fields of electrical engineering; see, for example, German Patent Document DE 10138751 A1. However, at very high switching frequencies (>20 kHz), the component behavior of the MOSFETs has a positive effect in comparison to IGBTs.

A classical inverter consists of a B6 bridge known to a person skilled in the art. The two switches of one of the three half bridges are never switched on at the same point in time. A dead time therefore exists, which ensures that the switches can securely switch the input voltage and that there will be no half-bridge short circuit. In addition, during the conducting, voltage drops will occur at the semiconductors, which may have a disadvantageous effect on the operating performance of the inverter.

It is an object of the invention to describe an improved power electronics unit.

According to the invention, the amplitude, the frequency and the phase position of the phase current at the phase current output can be predicted; the direction of the predicted phase current is used as an observation variable of the controller and the controller determines the switching time for the imminent switching cycle as a function of the direction of the predicted phase current.

The controller is situated in a control circuit and determines the switching time to be set at the two switching elements. For technical reasons, there is a time delay between the point in time of the determination of the switching time and the point in time of the switching of the two switching elements. This means that the actual phase current at the point in time of the setting of the determined switching time of the switches does not correspond to the phase current that was the actual phase current at the point in time of the determination of the switching time. This leading of the phase current or the lagging of the determination of the switching time to be set for an imminent switching cycle can be compensated by the forecast calculation of the actual phase current present at the point in time of the setting of the switches and is called a prediction in the present document. The prediction therefore relates to a prediction time period, which essentially corresponds to the data processing time period in the control circuit of the controller and which describes the extent of the time of the lagging of the determination of the switching time to be set.

It is a preferred variant of the invention that a first switching time can be set for a positive direction of the predicted phase current, and a second switching time can be set for a negative direction of the predicted phase current.

The determined switching time is therefore a function of the direction of the predicted phase current. Voltage drops in the power electronics unit can therefore be taken into account which are a function of the current direction.

In addition, it is advantageous for a zero cycle to be determinable by means of the current prediction, in which zero cycle the phase current changes the current direction.

Without limiting the generality, a power electronics unit frequently emits an alternating-current signal. As an alternating quantity, the phase current necessarily assumes the zero value at a specified point in time, which zero value falls into a specified switching cycle. This switching cycle is called a zero cycle.

According to an embodiment of the invention, the determined switching time for the zero cycle is between the first switching time and the second switching time.

This means that the determined switching time for the zero cycle represents a hybrid between the first switching time for positive phase current and between the second switching time for negative phase current.

According to a preferred embodiment of the invention, the power electronics system is included in a system which also comprises an electric machine and in which the phase current of the power electronics unit is essentially used as an input current for the drive of a rotor of the electric machine and the prediction is essentially based on the rotation of the rotor during the prediction time period.

The invention is based on the considerations explained in the following:

Present inverters for hybrid and electric vehicles, as a rule, use IGBTs as semiconductor switches. MOSFET inverters are normally not used because MOSFETS only permit the switching of lower voltages. This limits the efficiency of the inverters. However, the electric strength of MOSFETS has increased considerably and hybridization concepts of vehicles are realistic in lower power ranges of approximately 10 kW, as, for example, for an expanded 48 V onboard power supply system for the additional start of an internal-combustion engine or for electric driving.

A classical inverter consists of a B6 bridge. In this case, it is disadvantageous that the two switches of one bridge should never be switched on at the same point in time in order to prevent a short-circuit of the d.c. input voltage. A dead time therefore exists, so that the switches can securely switch the direct voltage (usually present in the form of an intermediate circuit voltage UZk). In addition, voltage drops occur at the semiconductors and at the switching elements of the circuit connecting the semiconductors, which has a disadvantageous effect on the quality of the outgoing alternating current.

According to the state of the art, the voltage drops at the components of the inverter are only insufficiently taken into account in MOSFET inverters. As a result, the inverter impresses a different voltage into the machine, than the voltage that would correspond to the actual target specification. Because of the change in polarity of the phase current, the individual phase is connected approximately to either UZk or to the electric ground. This results in current harmonics in the machine, and no purely sinusoidal alternating-current phase is generated. In this case, the 5th and 7th harmonics in the current and therefore the 6th harmonic in the torque are significant. The Clark-Park Transformation, as the mathematical phase transformation, which will not be explained here in detail, is the basis of the interrelationship between current harmonics of the 5th frequency and the 7th frequency going into the electric machine and the mechanical wave of the 6th order at the machine output. The harmonics lead to undesirable torque fluctuations. Since they act similarly to an idle current component in the current, they result in additional power losses in the machine and in the inverter. In this case, the idle-time event in the case of MOSFET inverters differs significantly from those in the case of IGBT inverters since, in contrast to IGBTs, MOSFETs as switches conduct current in both directions and exhibit a different component behavior.

In the case of more complex controllers, which take into account the polarity of the phase current and possibly a voltage drop in the inverter connected with the respective polarity when determining the switching time, disadvantageous errors will occur when setting the switches in precisely those cycles in which the polarity of the phase current changes.

It is therefore suggested to improve the switching time of the inverter by a measures, which can be implemented by software, in the switching cycles with a change of polarity.

This provides a smoother torque and thereby a calmer behavior of the electric machine with respect to vibrations, fluctuations and their acoustics. In addition, the efficiency of the inverter will be improved.

In the following, a preferred implementation of the invention will be described by means of the attached drawings indicating further details, preferred embodiments and further developments of the invention. The same reference numbers describe identical technical characteristics.

Other objects, advantages and novel features of the present invention will become apparent from the following detailed description of one or more preferred embodiments when considered in conjunction with the accompanying drawings.

DETAILED DESCRIPTION OF THE DRAWINGS

An embodiment shows an inverter as a power electronics unit. An inverter is used for inverting a direct voltage to an alternating voltage, particularly for generating polyphase alternating current from a direct-voltage source. For example, according to this embodiment, a polyphase electric machine in a vehicle having an electrified drive train is supplied with electric power from a direct-voltage energy accumulator.

In an inverter, a half bridge is used for every outgoing phase of the alternating current. According to FIG. 1, a half bridge comprises a first switching element (2) and a second switching element (3) with a phase output (1) between the two switching elements, in which the phase current $I_{Ph}$ is flowing. The first switching element comprises a high-side switch (HS,30) and the second switching element comprises a low-side switch (LS,31).

The high-side switch is assigned to the higher electric potential of the direct voltage to be inverted and the low-side switch is assigned to the lower potential of the direct voltage to be inverted.

Figure 1:
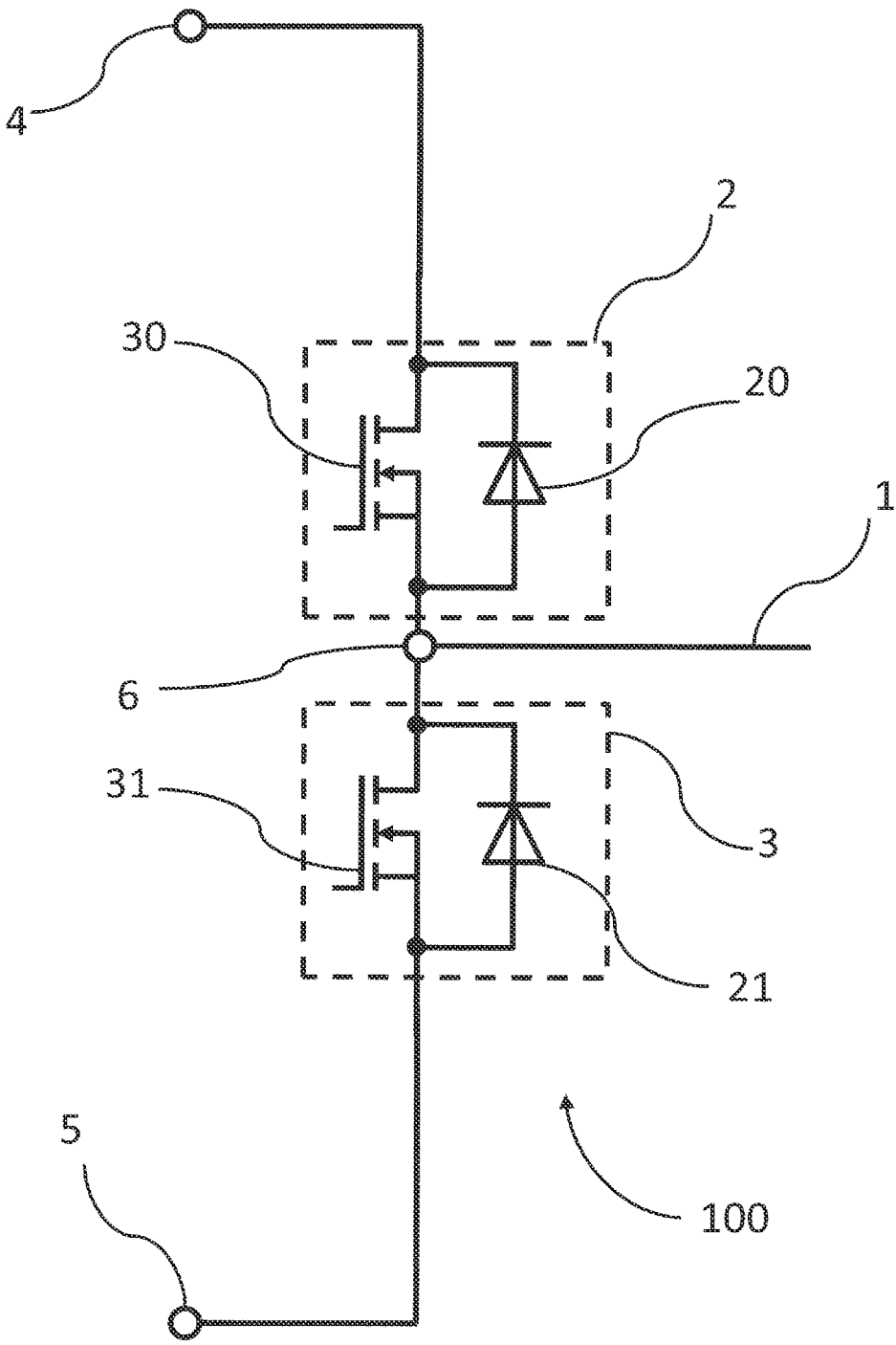
FIG. 1 is a schematic view of a circuit diagram of a half bridge of an inverter.

One fly-back diode (20, 21) respectively is connected parallel to the switches HS and LS in the flow direction illustrated in FIG. 1.

In the case of MOSFET inverters, the two switching elements (30, 31) per half bridge are constructed as transistors in MOSFET semiconductor components, and the fly-back diodes are constructed as body diodes in the MOSFET semiconductor components. Parallel to the MOSFETs, a further switching-related unit with a fly-back characteristic, such as another fly-back diode, may be connected.

In FIG. 1, the two combinations of the switch (30 or 31) and the fly-back diode (20 or 21) are called "switching element" (2 or 3).

Without limiting generality, the direct voltage $U_{Zk}$ (4) to be inverted is tapped as $U_{Zk}$ (4) and ground (i.e. 0 Volt) (5) from an intermediate circuit. The phase output has the phase potential (6).

Figure 2:
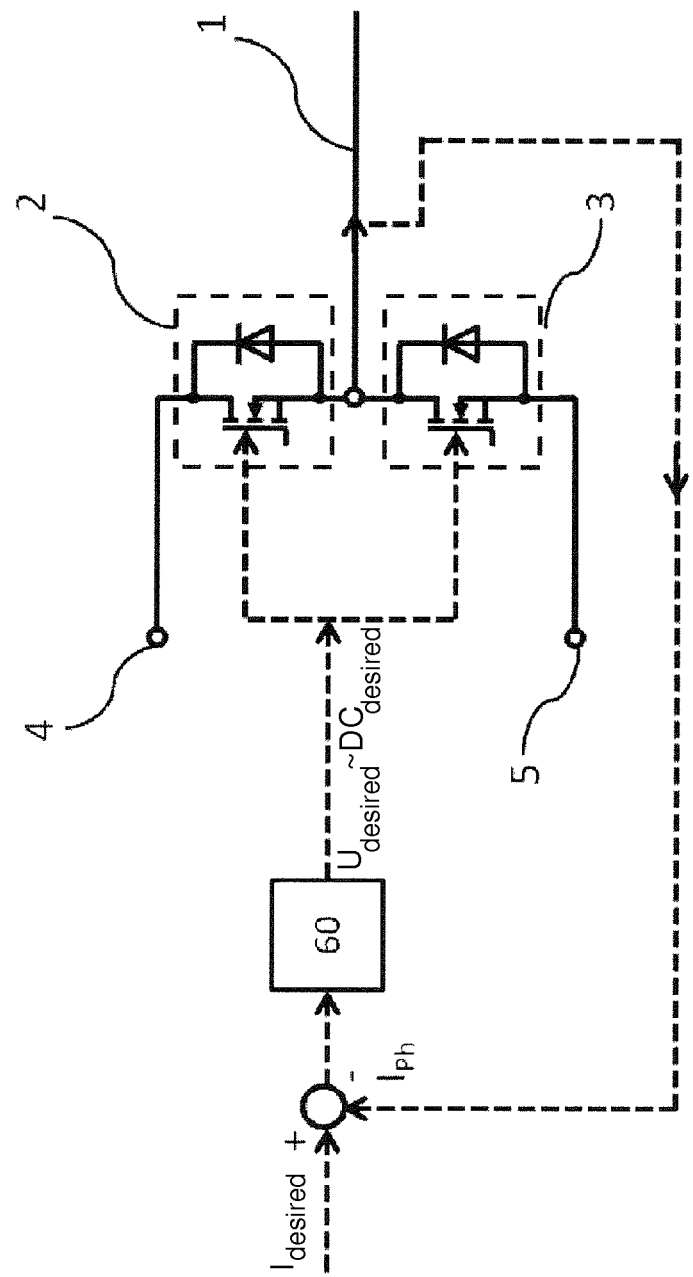
FIG. 2 is a schematic view of a control circuit for the half bridge.

A controller (60) is assigned to the half bridge in FIG. 1, which controller (60) switches the switches HS and LS, which is illustrated in FIG. 2.

From a specified current $I_{desired}$, which is to enter into the electric machine and the $I_{Ph}$ actually flowing into the machine, the controller will determine a desired voltage $U_{desired}$ at the phase output (6) and will switch the switches LS and HS according to this desired voltage.

Figure 3:
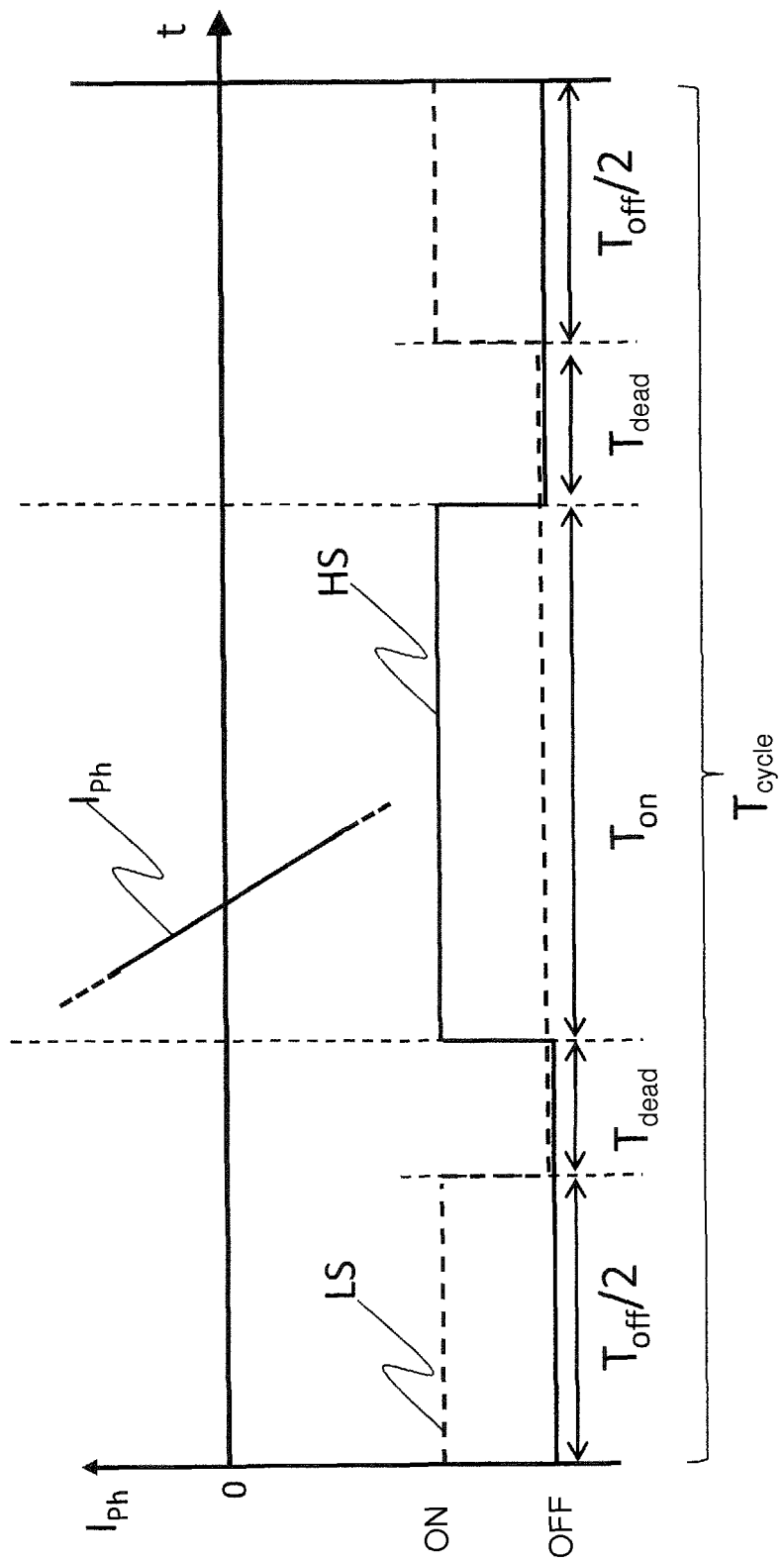
FIG. 3 is a schematic view of a zero crossing of the phase current.

In the time period t according to FIG. 3, the switches HS and LS are switched in a reciprocally pulse-width-modulated manner. Since this embodiment is based on the controlling of an electric machine, the pulse width modulation takes place according to the principle of space vector modulation known to the person skilled in the art. The switches each alternate between the two states "On", i.e. conductive state, and "Off", i.e. non-conductive state. The switches are switched at a specifiable frequency, which is called cycle frequency $f_{cycle}$. The time period in which the switch HS is switched on and the switch LS is switched off is called switching time Ton and the time period in which the switch HS is switched off and the switch LS is switched on is called switching time $T_{off}$. The period $T_{cycle}$ is inverse to $f_{cycle}$. The ratio $T_{on}/T_{cycle}$ is called the duty cycle $DC_{desired}$.

A half bridge is essentially controlled in the push-pull cycle. Accordingly, in a first approximation, HS takes up the state that is complementary to the state of the LS; i.e. the switch is in the "On" state, while the switch LS is in the "off" state and vice-versa. Within a short time period, which is called a dead period $T_{dead}$, a deviation exists from the push-pull principle such that, during $T_{dead}$, HS as well as LS are in the "off" state. In this case, a current flow can take place only by way of the fly-back diodes. The dead time is therefore also called a diode time $T_D$. The amount of the diode time is limited in the direction of short time by the switching characteristics of the switching semiconductor components.

In the case of the direct-voltage inverter, field-oriented controlling is used which is known to the person skilled in the art, the dimension of the field-forming current Id and the quantity of the torque-forming current $I_q$ being controlled. The output of the controller is characterized by the corresponding voltages $U_d$ and $U_q$. By means of an inverse Park-Clark transformation and the concept of space vector modulation, the duty cycle is determined therefrom for each of the three half bridges, for example, in the case of a B6 inverter.

The following desired target specification (Equation 1) applies to FIG. 1 and FIG. 2:

$$U_{Ph} \stackrel{!}{=} (U_{Soll} = DC_{Soll} \cdot U_{Zk})$$

This means that the actually emitted voltage $U_{Ph}$ at the phase output (6), averaged over the duration of the corresponding cycle, should correspond to the specified voltage $U_{desired}$. The desired voltage in this cycle is specified by the controller of the inverter, the control variable representing an ideally sinusoidal phase output. Thus, $DC_{desired} \cdot U_{Zk}$ is also an average voltage at the reference point of the phase output (6) between the semiconductor components per cycle. Because the intermediate circuit voltage is considered to be specified, a desired target specification of the voltage $U_{desired}$ is synonymous with the target specification of a unitless duty cycle $DC_{desired}$.

The inverter according to this embodiment comprises three half bridges according to FIG. 1. The three outgoing phases are called u, v, w. In contrast to FIG. 2, the measured current $I_{Ph}$ is not utilized as input of the controller (60). The measured current is subject to fluctuations, measuring inaccuracies and noise. As an improvement for ensuring Equation 1, it is suggested to use other current variables for the determination of $DC_{desired}$ as input parameters of the controller (60). The variable $I_{Ph}$ is replaced by the variable $I^*_{Ph}$ or, specifically for the respective half bridge of the three half bridges expressed by $I^*_{Ph,u}$, $I^*_{Ph,v}$ and $I^*_{Ph,w}$. In the case of a field-oriented controlling known per se to the person skilled in the art, the following is obtained per Clark-Park transformation (Equation 2):

$$\begin{bmatrix} I^*_{Ph,u} \\ I^*_{Ph,v} \\ I^*_{Ph,w} \end{bmatrix} = \begin{bmatrix} \cos(\beta_{el}) & -\sin(\beta_{el}) \\ \cos(\beta_{el} - 120°) & -\sin(\beta_{el} - 120°) \\ \cos(\beta_{el} + 120°) & -\sin(\beta_{el} + 120°) \end{bmatrix} \cdot \begin{bmatrix} I^*_d \\ I^*_q \end{bmatrix}$$

wherein $$\beta_{el} = \beta_{mech} \cdot Z_P$$

In this case, $\beta_{el}$ is the electric angle of the rotor which, as a rule, is formed from a measurement of the mechanical position of the rotor $\beta_{mech}$ and the number of pairs of poles of the rotor $Z_p$. The items $I_{d,desired}$ and $I_{q,desired}$ describe the desired target specification of the currents Iq and Id in the case of a field-oriented controlling of the electric machine known to the person skilled in the art.

As a rule, controllers for inverters, which are frequently constructed as microcontrollers, operate according to the principle that items, such as the $I_{Ph}$ or the angle of rotation $\beta_{el}$ are measured in one cycle, the actual controlling values are computed in the control circuit, and the resulting duty cycle is set one or more cycles later. This is so, among other things, because the microcontrollers require a certain time for data processing. Because of this time delay, the actually set duty cycle is "outdated" by those cycles which the microcontroller needs for the computation. This means that, at the point in time of the setting of the duty cycle, the items $I_{Ph}$ and angle of rotation $\beta_{el}$ assume values which would result in the setting of a possibly different duty cycle than the actually set duty cycle. It is therefore particularly skillful to achieve a "quasi" real-time control in that, when computing the actual controlling values, the measured items $I_{Ph}$ and angle of rotation $\beta_{el}$ are extrapolated for that point in time to items $I_{Ph\_ex}$ and $\beta_{el\_ex}$ when the duty cycle is actually set. The duty cycle to be set and the measured quantities $I_{Ph}$ and $\beta_{el}$ will then correspond directly with respect to time in the respective cycle in which the switches LS and HS are set.

The computation of items $I_{Ph\_ex}$ and $\beta_{el\_ex}$ is therefore based on the determination of the extent of the rotation which the rotor of the electric machine experiences during the data processing time of the microcontroller. The following applies in the case of a field-oriented control:

$$\beta_{el\_ex} = \beta_{el} + 2 \cdot \frac{\omega}{f_{Takt}}$$

$$\omega = 2 \cdot \pi \cdot f_{el}$$

with the electric rotational speed $f_{el}$ and the cycle frequency of the inverter $f_{cycle}$.

With the extrapolated angle of rotation $\beta_{el\_ex}$, the following will be obtained according to the Clark-Park transformation (Equation 3):

$$\begin{bmatrix} I^*_{Ph,u} \\ I^*_{Ph,v} \\ I^*_{Ph,w} \end{bmatrix} = \begin{bmatrix} \cos(\beta_{el}) & -\sin(\beta_{el}) \\ \cos(\beta_{el} - 120°) & -\sin(\beta_{el} - 120°) \\ \cos(\beta_{el} + 120°) & -\sin(\beta_{el} + 120°) \end{bmatrix} \cdot \begin{bmatrix} I^*_d \\ I^*_q \end{bmatrix}$$

According to Equation 3, the extrapolated current quantities for the individual phases are thereby obtained at the point in time at which the controlling of the switches is taking place. For a phase, for example, phase u, the item $I^*_{Ph,u\_ex}$ is therefore transmitted as the controlled variable to the controller.

Today's MOSFET inverters have the additional disadvantage that the dead time and the voltage drop at the LS and the HS are insufficiently taken into account when determining $DC_{desired}$, whereby the inverter outputs a different alternating current $I_{Ph}$ than the alternating current $I_{desired}$ that was specified per se, and the desired target specification according to Equation 1 cannot be met.

Typically, the desired target specification describes an ideal sinusoidal shape in the course of time of a phase current of an inverter to ideally be typically outputted. Deviations of the sinusoidal shape are exhibited as disturbing irregularities which lead to the task of "optimizing" the output signal $I_{Ph}$ and approximating an ideally typical sinusoidal signal.

The period duration $T_{Pd}$ of the outgoing current $I_{Ph}$ is obtained by parameters of the electric machine to be supplied. However, $T_{Pd} \gg T_{cycle}$ applies in general. Thus, it may occur that, during several cycles, the phase current $I_{Ph}$ has a current direction from the half bridge to the electric machine and, during several other cycles, has a current direction from the electric machine to the half bridge.

As a result of voltage drops at the switches LS and HS, whose amount is a function of the current direction of $I_{Ph}$ because of the construction of the MOSFETs, a characteristic pattern is obtained for each of the two current directions of $I_{Ph}$ which is a result of the deviation of the current $I_{Ph}$ from an ideal sinusoidal signal. This may lead to undesired three-phase current fluctuations in the electric machine. Because of the characteristic component behavior of MOSFETs, this behavior cannot be compared directly with the behavior of other semiconductor switching elements, such as IGBTs.

It is assumed that, in the following, without limiting generality, the controller in FIG. 2 is constructed such that the duty cycle $DC_{desired}$ to be set can be determined as a function of the polarity of the phase current in order to compensate phase-current-direction-dependent voltage drops at the components of a half bridge. This means that, at a positive (+) polarity of the phase current, i.e. in the case of a current direction of the phase current pointing from the half bridge to the electric machine, the determination of the duty cycle $DC_{desired}$ takes place according to a different computation method not to be indicated here in detail than at a negative (−) polarity of the phase current, i.e. in the case of a current direction of the phase current pointing from the electric machine to the half bridge. Accordingly, in the further description of this embodiment, the duty cycle $DC_{desired}$ is called DC+ (at $I_{Ph}>0$) and DC− (at $I_{Ph}<0$).

There are, however, a few individual cycles within which the polarity of the outgoing phase current $I_{Ph}$ changes. The zero crossing of the phase current in such a cycle is illustrated in FIG. 3 (phase current illustrated in the time section concerning the zero crossing; further course outlined by broken lines).

In these cases, with respect to a controller of the described type, neither DC+, nor DC− is therefore the best possible specifiable $DC_{desired}$.

The cycles are indicated below with the parameter t. The cycle with the zero crossing is described as cycle $t_0$ in the following; the cycle which follows this cycle with respect to time, is called cycle $t_0+1$, and the cycle which precedes cycle $t_0$ with respect to time is called cycle $t_0-1$.

In the case of a controller of the above-described type, in the event of a zero crossing in cycle $t_0$, a "hard" switch-over would occur between DC+ in cycle $t_0-1$ and DC− in cycle $t_0+1$ if a change of polarity occurs from positive phase current to negative phase current in cycle $t_0$.

It is therefore very advantageous according to a further embodiment for the predicted current $I^*_{Ph,u\_ex}$ (here, as an example, for phase u) to be checked with respect to a change of polarity.

Such a polarity check can take place according to the following equation (Equation 4):

$$VZW = sgn(I^*_{Ph,u\_ex}(Takt\ t)) - sgn(I^*_{Ph,u\_ex}(Takt\ t-1))$$

wherein the following applies to a change of polarity (VZW):

$$VZW \begin{cases} = 0 \\ \neq 0 \end{cases} \text{with} \begin{array}{l} \text{no sign change} \\ \text{sign change} \end{array}$$

In this case, the polarity of the actual predicted current is therefore compared by subtraction with that from the preceding cycle. According to this embodiment, the parameter VZW is transmitted to the controller as an additional input quantity. In the case of VZW=0, the computation of DC+ and DC− respectively takes place in the manner described above.

In the case of VZW≠0, a special duty cycle $DC_{t0}$ is selected which is between the values of DC+ and DC− respectively. The following (Equation 5) applies:

$$DC_{t0} = DC_{-} + \gamma \cdot \Delta DC_{\pm}$$

$$\Delta DC_{\pm} = DC_{+} - DC_{-}$$

wherein the weighting factor y is a function of the point in time of the current zero crossing within the cycle $t_0$.

If the exact machine and inverter behavior is known, the weighting factor can be computed by way of machine equations. Since these can usually not be described in a simple manner, the following equations of this embodiment will show a simplified variant:

$$\gamma = \begin{cases} 2 - \alpha & I_{Ph} < 0 \\ \alpha - 1 & \text{for } I_{Ph} \geq 0 \end{cases} \quad \text{(Equation 6)}$$

$$\alpha = f_{Takt} \cdot \frac{\sin^{-1}\left(\frac{|I_{Ph}|}{I_{Ph}}\right)}{2 \cdot \pi \cdot f_{el}} \quad \text{(Equation 7)}$$

In this case, it is assumed that the current in the phase output of the half bridge has a sinusoidal shape. Parameter α is the point in time of the current zero crossing relative to the cycle time $T_{cycle}$ and parameter $I_{Ph}$ is the amplitude of the phase current.

If the half bridge is a part of a frequency inverter which is controlled by field-oriented control, the amplitude can be computed, for example, from the currents Id and Iq respectively.

$$I_{Ph} = \sqrt{I_d^2 + I_q^2}$$

Thus, by means of Equations 6 and 7, the point in time of the current zero crossing within the cycle $t_0$ is computed and correspondingly a value $DC_{t0}$ according to Equation 5 is computed for the duty cycle, which is between the two values DC+ and DC−.

Advantageously, in Equation 7, no extrapolated current value is utilized for the computation of the current zero crossing but the actual value $I_{Ph}$. In the time domain, the zero crossing is in the future with respect to the determination of $I_{Ph}$. As an alternative, the extrapolated current $I_{Ph\_ex}$ can be utilized. In the time domain, the zero crossing of the current is in the past with respect to the determination of $I_{Ph\_ex}$. Without limitation of this generality, in Equations 6 and 7, the actual current is utilized for computing the zero crossing.

A further embodiment relates to a non-sinusoidal phase current $I_{Ph}$. Instead of Equations 6 and 7, the following is then alternatively specified for the equilibrium factor. If the current is linearly decreasing or increasing (for example, also as approximation of a sine about the 0 value), the following applies:

$$0 = \frac{dI_{Ph}}{dt} \cdot t_{I\_Ph=0} + I_{Ph\_a}$$

$$t_{I\_Ph=0} = -I_{Ph\_a} \Big/ \frac{dI_{Ph}}{dt}$$

$$\gamma = \frac{t_{I\_Ph=0}}{T_{Takt}}$$

wherein $I_{Ph\_a}$ is the current at the start of the cycle and $t_{I\_Ph=0}$ is the point in time within the cycle at which the current changes the polarity.

Since the electric machine or the inverter cannot follow the bounces of desired variables, errors may occur in a dynamic case. In a dynamic case, such high torque demands are made on the electric machine from one cycle to the next, that the inverter will not be able to set sufficiently high currents within the concerned cycles. This will result in so-called dynamic errors. If these errors are not tolerable in the selected application, according to one of the embodiments, in a supplementary fashion, one or more of the following methods can be applied in order to improve dynamics. The dynamic rise of the desired variables can be limited. Highly dynamic observers, such as Luenberger or Kalman can be used. In a dynamic case, it may also be advantageous to use the actual currents $I_{Ph,u}$, $I_{Ph,v}$, and $I_{Ph,w}$ for the control.

These embodiments are independent of the type of the electric machine. Without limiting generality, these machines may be 3- or 6-phase synchronous or asynchronous machines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A power electronics unit comprising a controller and at least one half bridge with a first switching element and with a second switching element, and having a phase current output between the two switching elements, at which phase current output the first switching element and the second switching element are switched in the push-pull mode for a switching time at a cycle frequency, and at which the controller sets the switching time and/or the cycle frequency as a control variable in order to provide, at the phase current output, a specified amplitude, frequency and phase position of the phase current within an imminent switching cycle, wherein the controller is configured to:
   predict the amplitude, the frequency and the phase position of the phase current at the phase current output,
   use, as an observation variable, a direction of the predicted phase current, and
   determine the switching time for the imminent switching cycle as a function of the direction of the predicted phase current.

2. The power electronics unit according to claim 1, wherein
   the controller sets a first switching time for a positive direction of the predicted phase current, and
   the controller sets a second switching time for a negative direction of the predicted phase current.

3. The power electronics unit according to claim 2, wherein, based on the predicted phase current, a zero cycle is determined by the controller in which the phase current changes direction.

4. The power electronics unit according to claim 3, wherein for the zero cycle, the determined switching time is between the first switching time and the second switching time.

5. The power electronics unit according to claim 1, wherein
   the predicted phase current relates to a prediction time period, and
   the prediction time period essentially corresponds to a data processing time period in the control circuit.

6. The power electronics unit according to claim 2, wherein
   the predicted phase current relates to a prediction time period, and
   the prediction time period essentially corresponds to a data processing time period in the control circuit.

7. The power electronics unit according to claim 3, wherein
   the predicted phase current relates to a prediction time period, and
   the prediction time period essentially corresponds to a data processing time period in the control circuit.

8. The power electronics unit according to claim 4, wherein
   the predicted phase current relates to a prediction time period, and
   the prediction time period essentially corresponds to a data processing time period in the control circuit.

9. The power electronics unit according to claim 1, wherein the controller is further configured to predict the amplitude, the frequency and the phase position of the phase current at the phase current output at a point in time of setting the first and second switching elements.

\* \* \* \* \*